United States Patent [19]
Bros et al.

[11] 4,367,843
[45] Jan. 11, 1983

[54] ANIMAL PROD

[75] Inventors: Daniel M. Bros, Edina; William G. Bartel, Wayzata; LaVerne M. Larsen, Edina, all of Minn.

[73] Assignee: Hot-Shot Products Co., Savage, Minn.

[21] Appl. No.: 126,946

[22] Filed: Mar. 3, 1980

[51] Int. Cl.³ .................... B68B 11/00; F41B 15/04
[52] U.S. Cl. ................................ 231/2 E; 273/84 ES
[58] Field of Search ............... 231/2 E; 119/29; 128/24.1, 68.1; 272/27; 273/84 ES

[56] References Cited
U.S. PATENT DOCUMENTS

| | | | |
|---|---|---|---|
| 2,204,041 | 6/1940 | Jefferson | 273/84 ES |
| 2,981,465 | 4/1961 | Bartel | 231/2 E |
| 3,119,554 | 1/1964 | Fagan et al. | 273/84 ES |
| 3,917,268 | 11/1975 | Tingey et al. | 231/2 E X |

Primary Examiner—Gene Mancene
Assistant Examiner—Robert P. Swiatek
Attorney, Agent, or Firm—Williamson, Bains, Moore & Hansen

[57] ABSTRACT

The animal prod comprises one or more electrodes attached to an insulating case and is usable to apply electrical stimulus shocks to control the behavior of animals. Structures are provided to restrain the electrodes and bias the electrodes in forceable contact with electrical terminals. The electrical terminals are electrically connected to a high-voltage oscillator circuit which is actuated by a weather-resistant, flush-mounted push-button switch. The push-button switch is provided with a slidable cover to prevent unintentional actuation. The insulative case is equipped with a removable battery cover, the cover being held to the case by a retaining mechanism which includes a sliding fastener.

13 Claims, 8 Drawing Figures

ANIMAL PROD

BACKGROUND OF THE INVENTION

This invention relates to the field of animal prods and discloses a lightweight, easily carried electric shock generating prod.

Devices which provide an electric shock to control behavior or movement of animals are well known. Prior art devices have included hand-held models having a pair of electrodes. Animal prod models having removable battery covers attached by screws are known.

A serious problem associated with many known animal prods is the prevention of electrical malfunctions such as short circuits caused by entry of rain, snow, or other foreign substances into the prod. Some prior art prods are designed to actuate the shocking current by applying forces to the electrodes as when they are urged against the hide of an animal. Such prods may be unintentionally actuated by inadvertently pushing in an electrode. Also, foreign substances may enter such prods through the oversized hole in the case in which the electrode freely slides during actuation. Often these prods are used under circumstances where it is critical that they function properly and at times human life may depend on the shocking power being delivered immediately and without malfunction as when there is a threat of the operator being crushed between heavy converging livestock. The present invention provides this needed reliability.

Animals commonly may react with sudden violent movements when shocked electrically by a prod. Due to such movement, many prior art animal prods experienced damage such as loosened, detached or broken electrodes. Extreme stresses may be applied to the electrodes when an animal prod is used to shock an animal and particularly so when the electrodes may become temporarily snarled or retained in the animal's coat.

SUMMARY OF THE INVENTION

Accordingly, it is an object of this invention to provide a hand-held animal prod capable of reliably delivering electrical stimulus shocks to control the movement or behavior of animals.

Another object of the invention is to provide an animal prod capable of operation in extremes of weather, including rain and snow, and capable of sustained operation when exposed to foreign substances such as liquids or particles.

A further object of the invention is to provide an animal prod having means for preventing unintentional actuation thereof.

An object of the invention is to provide an animal prod having a removable battery cover secured by a sliding fastener to permit easy removal of the battery cover, yet insuring that the battery cover is securely retained during use.

A still further object of the invention is to provide an animal prod having one or more electrodes and having electrode restraint means such that the electrodes are securely retained as a part of the animal prod and such that the electrodes maintain reliable electrical contact with electrical terminals even during rough usage.

Briefly, the invention comprises an electrically insulating case containing electronic circuitry and having two electrodes projecting outwardly from the case. The electrodes are each mounted in a bore to stabilize the electrode and reliably retain each electrode in position along the axis of the bore. The bore closely surrounds the electrode to prevent the entry of moisture or other foreign substances inside the case. Restraint means are used to prohibit electrode movements axially along the bore and to forceably urge the electrodes into contact with electrical terminals. Actuation of the electronic circuitry of the animal prod is controlled by a flush-mounted push-button switch covered by a deformable membrane which serves to prevent the entry of moisture inside the animal prod case. The push-button switch is further equipped with a sliding cover to allow the animal prod to be placed in a "safety" condition such that accidental energization of the electronic circuitry does not occur. The case of the animal prod is equipped with a removable battery cover to allow easy replacement of batteries used to power the electronic circuitry. The battery cover is removably retained as a part of the animal prod case by a sliding fastener.

These and other objects and advantages of my invention will appear more fully from the following description made in conjunction with the accompanying drawings wherein like reference characters refer to the same or similar parts throughout the several views.

DESCRIPTION OF THE DRAWING FIGURES

DESCRIPTION OF THE PREFERRED EMBODIMENT

Figure 1:
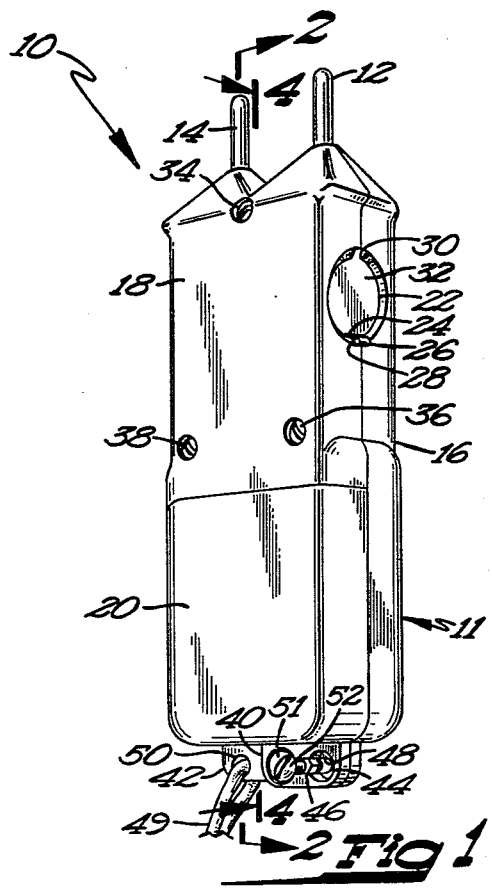
FIG. 1 is a side perspective view of the animal prod.

Referring first to FIG. 1, animal prod 10 includes electrically conductive rod electrodes 12 and 14 projecting from case 11 for delivering electrical stimulus shocks to the body of an animal. Case 11 comprises base structure 16 having front cover 18 and battery compartment cover structure 20 mounted thereon. Front cover 18 is securely attached to base 16 by means of screws 34, 36 and 38. Case 11 is of a sufficiently small size so that animal prod 10 may be conveniently hand-held and easily carried.

Lug member 42 is mounted on base 16 and has a slot 48 which passes through lug 42. Lug member 40 is mounted on battery compartment cover 20 and has a hole 44 and a slot 46 extending from hole 44. Hole 44 and slot 46 pass through lug 40. Lug members 40 and 42 are preferably narrow flanges which are parallel and mate together when battery compartment cover structure 20 is in place on base structure 16. Slot 46 is parallel to, aligned with, and extends for the same length as slot 48. Lug 42 is further equipped with a hole 50 through which a carrying cord 49 is threaded.

Sliding fastener 51 is slidably mounted in slot 48 and releasably retains lug 42 relative to lug 40. Lugs 40 and 42 and fastener 51 form a retaining mechanism for releasably retaining battery compartment cover 20 on base 16. Head 52 of fastener 51 is preferably a standard head of a slotted round-head machine screw of the usual type. Head 52 is small enough in diameter to pass through hole 44 but is too large in diameter to pass through slots 46 or 48. Fastener 51 is capable of sliding along slots 46 and 48.

Finger hole 22 is preferably a round, inwardly tapering hole in case 11. Deformable cover 32 is flush mounted inside case 11 beneath hole 22 so that cover 32 may be pushed by an operator's finger. Deformable cover 32 is preferably a very flexible, non-porous, electrically insulating membrane which deforms substantially when pushed by an operator's finger.

Slidable cover 24 is a relatively non-deformable member slidably mounted over deformable cover 32. Cover 24 is mounted beneath hole 22 and is slidable to permit covering and uncovering the deformable cover 32. Cover 24 is relatively non-deformable compared to cover 32. When cover 24 is covering deformable cover 32, cover 32 is prevented from deforming. When cover 24 is not covering deformable cover 32, and when cover 32 is pushed by an operator's finger, cover 32 deforms substantially.

Knob 26 is attached to and projects from cover 24 and may be grasped by an operator to slide cover 24. Knob 26 fits into notches 28 and 30 in case 11 which define the limits to the sliding motion of cover 24. In FIG. 1, cover 32 is uncovered and knob 26 is in notch 28.

Figure 2:
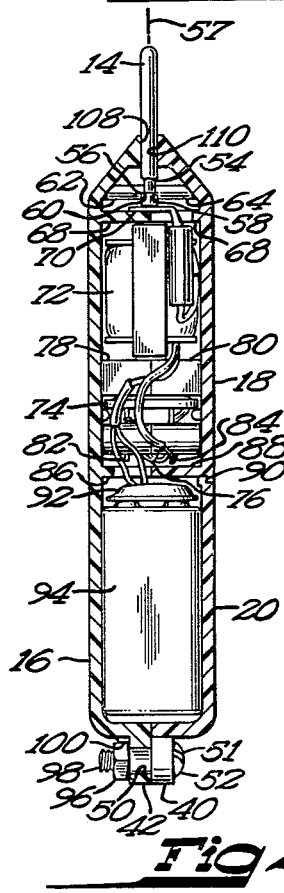
FIG. 2 is a cross-sectional side elevation view of the animal prod taken along cutting plan 2—2 of FIG. 1.

Referring now to FIG. 2, case 11 has an elongated, cylindrical bore formed by the cooperation of channel 108 in base 16 and channel 110 in front cover 18. Electrode 14 is mounted inside the bore formed by channels 108 and 110 which stabilize electrode 14 and restrict electrode 14 to lie along the central longitudinal axis 57 of the cylindrical bore formed by the cooperation of channel 108 and channel 110. The bore formed by channels 108 and 110 closely surrounds electrode 14 to prevent the entry of moisture or other foreign substances into case 11.

Electrode 14 is preferably an elongated, solid metallic, circular cylinder having a circumferential groove 54. Post member 62 is preferably a solid circular cylinder composed of resilient material, attached to base 16, and having a lip 56 which projects into groove 54 and contacts surface 60 of electrode 14. Post member 64 is similar in construction to post member 62, is attached to front cover 18, and has a lip 58 which projects into groove 54 and contacts surface 60 of electrode 14. Post members 62 and 64 are in coaxial alignment and project into groove 54 from opposite sides of electrode 14 so that electrode 14 is confined between post members 62 and 64.

Electrode 14 is trapped between support member 68 and post member 62 so that electrode 14 is prevented from moving along axis 57 of the bore formed by channels 108 and 110 and is brought into forcible contact with terminal 70 as will be described further hereafter. Post members 62 and 64 cooperate to trap electrode 14 between support member 68 and the post members 62 and 64. Support member 68 is preferably a thin wall attached to and extending across base 16 and is preferably composed of a resilient material.

Electrical terminal 70 is preferably composed of electrically conductive metal, is mounted between electrode 14 and support member 68, and makes electrical contact with electrode 14. Animal prod 10 is assembled by placing electrode 14 and terminal 70 between support member 68 and the post members 62 and 64.

During assembly the electrode 14 is forced into position with the post members 62 and 64 being flexed away from the surface 68 so that a restoring force is generated in the post members; this restoring force urges the lips 56 and 58 against surface 60 to urge the electrode 10 against terminal 70 to assure a reliable electrical contact between terminal and electrode. During insertion of the electrodes, support member 68 is also urged away from the post members 62 and 64, thereby biasing the support member 68 to urge the adjacent terminal 70 toward electrode 14. Because of the resilient nature of support member 68 and the post members 62 and 64, said members are each able to be placed in a tensioned condition when forcibly deformed.

When electrode 14 and terminal 70 are placed between support member 68 and the post members 62 and 64 support member 68 and the post members 62 and 64 are in this tensioned condition and post members 62 and 64 cooperate to forcibly urge the base of electrode 14 toward terminal 70 and toward support member 68. Support member 68 interacts with the electrode 14 by forcibly urging electrode 14 toward post members 62 and 64, and post members 62 and 64 cooperate to produce a substantially uniform force across the area of contact between electrode 14 and terminal 70. Thus, post members 62 and 64 engage the side of electrode 14 and function to trap electrode 14 and terminal 70 between members 62 and 64 and member 68 and to insure good electrical contact between electrode 14 and terminal 70.

Terminal 70 is electrically connected to the secondary winding of transformer 72, which is positioned adjoining support member 68 inside case 11. Transistor 74 has a standard TO-3 case shape and is held in place inside case 11 by supports 78 and 80 which mateably receive the circular disc portion of transistor 74. Support 78 is preferably a "C" shaped wall attached to and projecting from base 16. Support 80 is preferably a "C" shaped wall attached to and projecting from front cover 18. Supports 78 and 80 cooperate to form a hollow, square depression to insertably receive and grip the circular disc portion of transistor 74 and thereby hold transistor 74 in place inside case 11.

Lead 82 of transistor 74 is associated with the emitter of transistor 74 and is electrically connected to the primary winding $W_1$ of transformer 72. Lead 84 of transistor 74 is associated with the base of transistor 74 and is electrically connected with resistor 76. The metallic case of transistor 74 is associated with the collector of transistor 74.

Walls 86 and 88 serve to define a battery compartment inside case 11 for the storage of a pair of nine-volt transistor radio type batteries of the usual kind, of which battery 94 is typical. Wall 86 is attached to and projects from base 16. Wall 88 is attached to and projects from front cover 18. Walls 86 and 88 contact one another and cooperate to form a battery compartment inside case 11 and under battery compartment cover 20. Walls 86 and 88 serve to hold batteries 94 and 95 in place and thus serve to protect transistor 74, resistor 76 and other parts of the electrical circuitry of animal prod 10 from mechanical damage due to movement of the batteries. Wall 86 is equipped with a slot allowing electrically conductive wires to pass therethrough. Battery clips 92 and 93 are commercially available connectors and serve to connect electrically conductive wires to the terminals of batteries 94 and 95, respectively.

Battery compartment cover 20 is equipped with a lip 90 which fits under front cover 18 and which cooperates with sliding fastener 51 to releasably retain cover 20 on base 16. When cover 20 is in place on base 16, lip 90 tightly fits under and against cover 18 to securely retain cover 20 and to prevent the entry of moisture or foreign substances into case 11.

Sliding fastener 51 consists of a head 52, a fastener body 98 and a retaining nut 96. Head 52 and fastener body 98, taken together, preferably comprise a slotted round-head machine screw of the usual type. Retaining nut 96 is preferably a hexagonal nut of the usual type which has six flat sides and which is threadably mounted on fastener body 98. Step 100 is an elongated, rectangular, flat ridge mounted on base 16 adjacent lug member 42.

Figure 3:
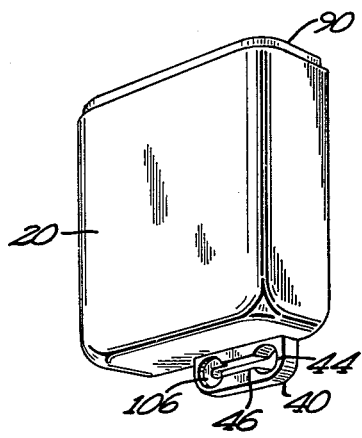
FIG. 3 is a side perspective view of the battery cover.
Figure 5:
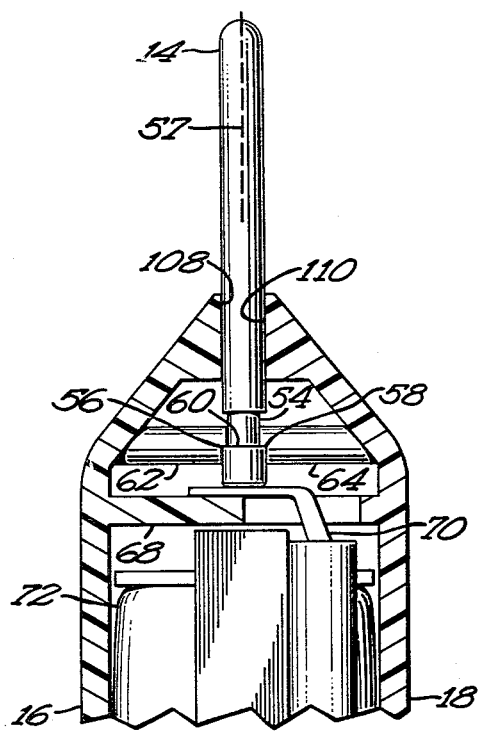
FIG. 5 is a cross-sectional side elevation view of a portion of the animal prod taken along cutting plane 2—2 of FIG. 1 and is a magnification of the forward portion of drawing FIG. 2.

Referring next to FIG. 3, lip 90 is an elongated, narrow, recessed lip attached to the periphery of battery cover 20. Lip 90 fits under and interlocks with front cover 18 when battery cover 20 is in place on base 16. Lug member 40 has a recess 106 located at the opposite end of slot 46 from hole 44. Recess 106 is circular, has a flat bottom, and has a diameter large enough to accomodate head 52 of sliding fastener 51.

Figure 4:
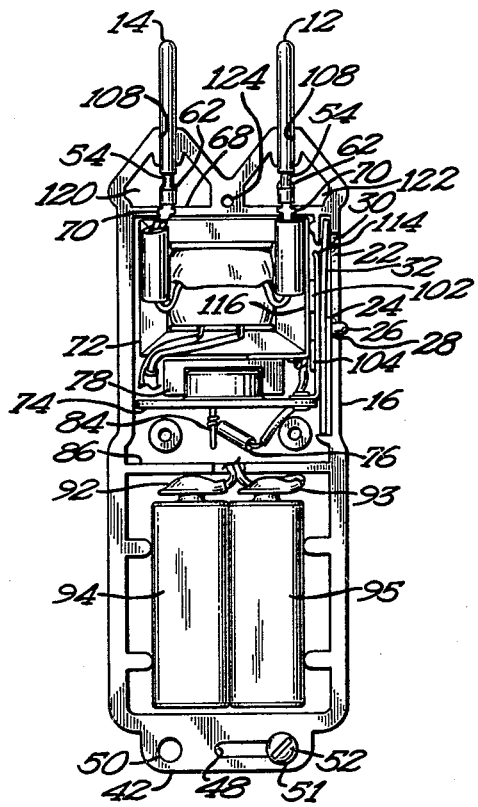
FIG. 4 is a cross-sectional top elevation view of the animal prod taken along cutting plan 4—4 of FIG. 1.

Referring next to FIG. 4, rod electrode 12 is retained inside a bore in case 11 by restraint means structurally like the restraint means for retaining rod electrode 14 in the bore formed by channels 108 and 110 in case 11. Terminals 70 are electrically connected to opposite ends of the secondary winding of transformer 72. Terminals 70 also each separately contact one of the rod electrodes 12 and 14.

Contact 116 forms a first switch element and comprises an elongated, electrically conductive metal strip which is mounted on and supported by transformer 72. Contact 116 is bent into an "L" shape to conform to the rectangular shape of transformer 72 and is wedged in place between transformer 72 and support 78. Strip 114 forms a second switch element and comprises an elongated, elastic, electrically conductive metal strip. Strip 114 is electrically connected to and mechanically cantilevered from the case of transistor 74. Thus, strip 114 is electrically connected to the collector of transistor 74 since strip 114 is riveted to the case of transistor 74.

Strip 114 is positioned inside case 11 underneath deformable cover 32. Taken together, contact 116, strip 114 and deformable cover 32 comprise a push-button switch. When the push button switch is depressed by applying forces with an operator's finger on deformable cover 32, deformable cover 32 deforms and thereby transmits forces to strip 114 to cause strip 114 to make electrical and mechanical contact with contact 116. Strip 114 is mounted so as to move into electrical and mechanical contact with the contact 116 and complete an electrical circuit when the push-button switch is depressed.

Insulator strips 102 and 104 are mechanically connected and formed of a thin, plastic, electrically insulating sheet material. Strips 102 and 104 are slipped between strip 114 and contact 116 to act as separators and to prevent electrical contact between strip 114 and contact 116 when deformable cover 32 is not pushed.

Figure 6:
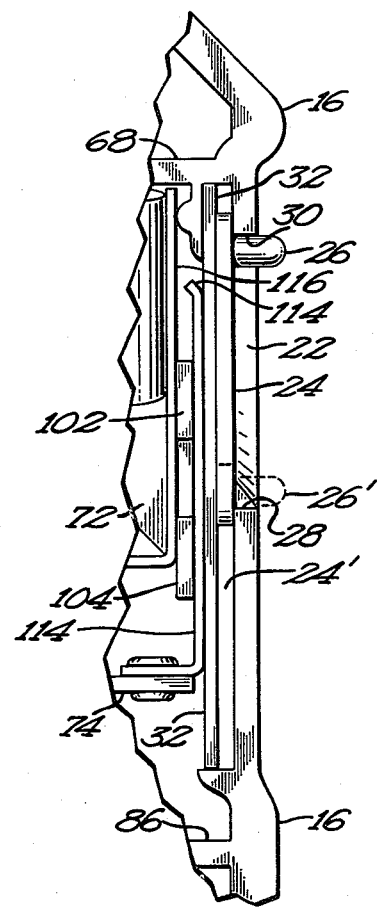
FIG. 6 is a cross-sectional top elevation view of a portion of the animal prod taken along cutting plane 4—4 of FIG. 1.

Referring next to FIG. 6, knob 26 is in notch 30 and slidable cover 24 is covering deformable cover 32, thus preventing cover 32 from being deformed. This position of cover 24 is a "safety" condition for animal prod 10 such that accidental energization of the electronic circuitry of animal prod 10 does not occur.

Slidable cover 24 is shown in phantom as 24' in its position when cover 32 is uncovered. In this position, knob 26 is in the position shown as 26' and is in notch 28. When slidable cover 24 is in the position shown as 24', the electronic circuitry of animal prod 10 may be energized by an operator pressing his finger on cover 32 and thereby deforming cover 32 so that strip 114 bends to touch contact 116.

Figure 7:
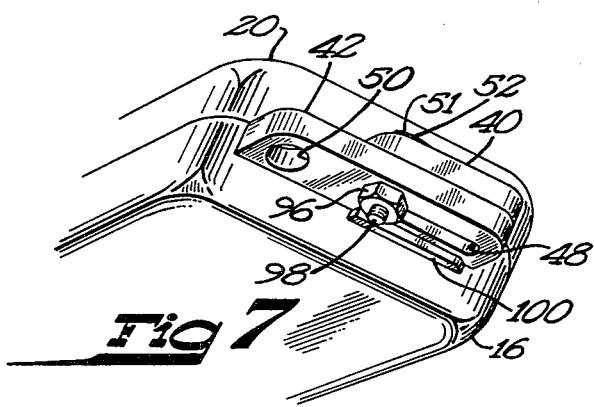
FIG. 7 is a rear perspective view of the animal prod.

Referring next to FIG. 7, step 100 is aligned parallel to the slot 48 and extends along the length of the slot 48. Step 100 fits against and cooperates with the flat sides of retaining nut 96 to prevent loosening of slidable fastener 51 by preventing rotation of nut 96.

Figure 8:
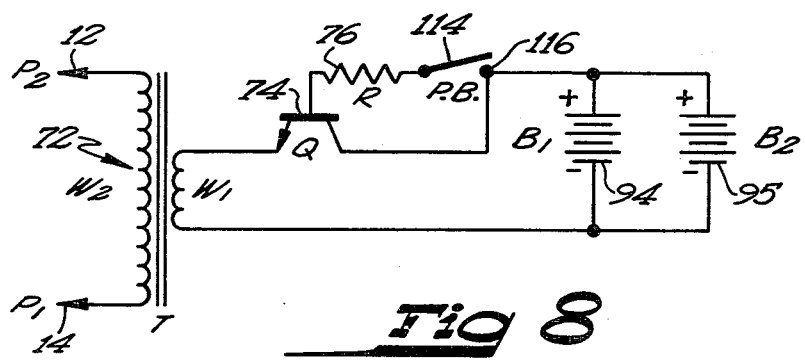
FIG. 8 is a schematic diagram of the electrical circuitry used in the animal prod.

Referring next to FIG. 8, the schematic symbols $B_1$ and $B_2$ correspond to batteries 94 and 95, respectively. The schematic symbol PB corresponds to the push-button switch formed by contact 116, strip 114 and cover 32. The schematic symbol R corresponds to resistor 76. The schematic symbol Q corresponds to transistor 74. Transformer 72 is schematically symbolized by T having a primary winding $W_1$ and a secondary winding $W_2$. The schematic symbols $P_1$ and $P_2$ correspond to electrodes 12 and 14. The electrical circuitry which is represented by the schematic diagram is a high-voltage oscillator circuit which is actuateable or energizable by a push-button switch.

OPERATION

This animal prod 10 is designed to be conveniently carried in the hand of a user with the carrying cord 49 looped about the user's wrist to prevent the prod 10 from being dropped. The prod 10 is normally carried in a "safety" condition with cover 24 in place over deformable cover 32 to prevent the prod from being accidentally energized, as best shown at 24 in FIG. 6.

When the prod 10 is to be used to deliver electrical stimulus shocks to an animal to control the movement or behavior of that animal, cover 24 is slid back to the position 24' shown in FIG. 6 so that the operator may place his finger on the deformable cover 32. The operator then presses on cover 32 in a direction normal to cover 32 so that the electronic circuitry of animal prod 10 is energized and so that high voltages are produced between the electrodes 12 and 14. The operator then presses animal prod 10 against the body of the animal to be controlled in such a way that both electrode 12 and electrode 14 make mechanical and electrical contact with the body of the animal. An electrical shock is delivered to the animal for as long as cover 32 is depressed and electrodes 12 and 14 remain in contact with the animal's body.

At all times the electrodes 12 and 14 are held securely in position by the cooperating channels 108 and 110, and the already described restoring forces applied to electrodes 12 and 14 by posts 62 and 64 and by cooperating wall 68 firmly urge each electrode against an adjacent terminal 70 to assure a reliable electrical contact therebetween. Accordingly, when the prod 10 is subjected to severe usage as when livestock exert forces on the electrodes so as to dislodge or twist the electrodes, the electrodes are still rigidly retained and function normally.

The tight fit between the electrodes 12 and 14 and the adjacent channels 108 and 110 prevents the entry therealong of most moisture and dirt. However, should minute quantities of moisture penetrate along the channels, such moisture is isolated in chambers 120 and 122 and divider 124 prevents movement of such moisture between the chambers and reduces the risk of internal shorting between electrodes 12 and 14.

After use, animal prod 10 is placed back in a "safety" condition by sliding the cover 24 into place over cover 32, as shown in FIG. 6.

Battery cover 20 may be removed from base 16 to replace batteries 94 and 95 by using a screwdriver to turn head 52 and thus loosen the sliding fastener 51. Sliding fastener 51 is loosened sufficiently to allow head 52 to pop out of recess 106 (FIG. 3) and to allow fastener 51 to slide along slots 46 and 48 until head 52 reaches hole 44. Head 52 is then pushed through hole 44 thus allowing cover 20 to be removed from base 16.

Cover 20 is replaced on base 16 by inserting lip 90 under front cover 18 and positioning lug 40 over lug 42. Head 52 is then pushed through hole 44 and fastener 51 is slid along slots 46 and 48 until head 52 is over recess 106. Fastener 51 is then tightened by using a screwdriver to turn head 52, the fastener 51 being tightened sufficiently so that head 52 is drawn into recess 106 and lug 42 is held securely against lug 40. Step 40 prevents rotation of nut 96 and thus allows fastener 51 to be easily tightened and insures that fastener 51 will remain tight.

While the preferred embodiments of the present invention have been described, it should be understood that various changes, adaptations and modifications may be made therein without departing from the spirit of the invention and the scope of the appended claims.

What is claimed is:

1. An animal prod comprising:
   a case having a plurality of bores;
   a plurality of electrically conductive rod electrodes each having a base and side and being mounted inside said bores and projecting from said case for delivering electrical stimulus shocks to the body of an animal;
   electrically circuitry contained inside said case and electrically connected to said rod electrodes for providing said rod electrodes with electrical stimulus shock signals;
   a restraint means mounted inside said case for retaining one of said rod electrodes inside one of said bores, wherein said restraint means comprises:
   a first member; and
   a second member interacting with the base of said rod electrode to trap said rod electrode between said first member engaging the side of said rod electrode and said second member so that said rod electrode is prevented from moving along said bore.

2. The animal prod of claim 1 wherein said rod electrode has a circumferential groove and said second member has a lip which projects into said groove and contacts said rod electrode.

3. The animal prod of claim 2 wherein said restraint means further comprises a third member having a lip which projects into said groove and contacts said rod electrode so that said rod electrode is between said second member and said third member, and so that said second member and said third member cooperate to trap said rod electrode between said first member and said second and third members.

4. The animal prod of claim 3 wherein said second member and said third member are composed of resilient materials and are mounted in tensioned conditions and cooperate together to forcibly urge said rod electrode towards said first member.

5. The animal prod of claim 4 further comprising an electrically conductive terminal which is electrically connected to said electrical circuitry; and which is mounted between said rod electrode and said first member, and which makes electrical contact with said rod electrode; and wherein said second member and said third member cooperate to forcibly urge said rod electrode towards said terminal, and produce a substantially uniform force across the area of contact between said terminal and said rod electrode.

6. The animal prod of claim 1 wherein said first member is composed of a resilient material and is mounted in a tensioned condition to forcibly urge said rod electrode towards said second member.

7. The animal prod of claim 6 further comprising an electrically conductive terminal which is electrically connected to said electrical circuitry, and which is mounted between said rod electrode and said first member, and which is forcibly urged towards said rod electrode by said first member, and which makes electrical contact with said rod electrode.

8. An animal prod having electrical circuitry for delivering electrical stimulus shocks to animals, said animal prod including a prod base structure and a removable battery compartment cover structure and having a retaining mechanism for releasably retaining said removable battery compartment cover structure on said prod base structure, wherein said retaining mechanism comprises:
   a first lug member mounted on one of said structures and having a first slot therein;
   a second lug member mounted on the other of said structures and having a second hole therein and having a second slot extending from said second hole; and
   a sliding fastener slidably mounted in said first slot of said first lug member and being capable of passing through said second hole of said second lug member and further being capable of sliding along said first slot and said second slot to releasably retain said first lug member relative to said second lug member.

9. The animal prod of claim 8 wherein said sliding fastener comprises:
   a body capable of sliding along said first slot and said second slot;
   a head mounted on said body and being capable of passing through said second hole of said second lug member; and
   a retainer mounted on said body such that when said head is passed through said second hole, said body may be slid along said first slot and said second slot thereby trapping said first lug member and said second lug member between said head and said retainer.

10. The animal prod of claim 9 wherein said second lug member has said second slot extending from said second hole to a recess, said recess extending partially through said second lug member and being capable of receiving said head of said sliding fastener.

11. The animal prod of claim 9 wherein:
   said retainer is threadably mounted on said body;
   said retainer has at least one flat side; and
   a flat step is mounted adjacent said first lug member such that said step cooperates with said flat side to prevent loosening of said slidable fastener by preventing rotation of said retainer.

12. An animal prod having electrical circuitry for delivering electrical stimulus shock to animals, said electrical circuitry being controlled by a push-button switch comprising:
   a first switch element;
   a second switch element which is mounted so as to move into contact with said first switch element and complete an electrical circuit when said push-button switch is pushed by an operator's finger; and
   a deformable cover adapted to deform when said push-button switch is pushed and to thereby transmit forces to said second switch element to cause said second switch element to contact said first switch element;
   and a slidable cover for preventing accidental pushing of said push-button switch, wherein said slidable cover comprises a relatively non-deformable member slidably mounted to cover and uncover said deformable cover.

13. An animal prod having electrical circuitry for delivering electrical stimulus shock to animals, said electrical circuitry being controlled by a push-button switch comprising:
   a first switch element;
   a second switch element which is mounted so as to move into contact with said first switch element and complete an electrical circuit when said push-button switch is pushed by an operator's finger; and
   a deformable cover adapted to deform when said push-button switch is pushed and to thereby transmit forces to said second switch element to cause said second switch element to contact said first switch element;
   and a transistor mounted within said prod and said second switch element comprising a strip of elastic, electrically conductive material mechanically cantilevered from and electrically connected to said transistor.

* * * * *